United States Patent Office 3,294,535
Patented Dec. 27, 1966

3,294,535
PROCESS FOR DEVELOPING DIAZOTYPE ARTICLE COMPRISING MOLECULAR SIEVE WITH ALKALINE MATERIAL ABSORBED THEREIN
John B. Powers, Tonawanda, N.Y., assignor to Union Carbide Corporation, a corporation of New York
No Drawing. Filed Mar. 1, 1962, Ser. No. 176,786
4 Claims. (Cl. 96—49)

This invention relates to a developer for photo sensitive copy processes and more particularly to a developer for diazotype printing processes.

Diazo printing processes are based on the light sensitivity of aromatic diazo compounds. Exposure to light destroys the diazo compound so that it can no longer form a dye by reaction with amino or phenolic coupling components.

There are two known diazotype printing systems. In the two-component system, the paper or any other suitable base material is coated with a mixture of a light-sensitive stabilized diazo compound and an azo coupling component. No coupling takes place as long as the mixture is neutral or acid. On exposure to ultraviolet light in contact with a tracing, the diazo compound decomposes where the tracing is transparent. Then when the base material is exposed to a material alkaline in nature, for example ammonia vapor or an alkaline solution, coupling takes place between the undecomposed diazo compound and the coupling component and the image develops as colored lines on the base. The color depends on the combination of diazo compound and coupler with which the paper was coated.

In a one-component system, the base material is coated with a stabilized diazo compound only. Light exposure destroys the diazo in the non-image areas, and development consists in treatment with a solution containing the coupling component to form a dye with the unchanged diazo compound.

For two-component systems, diazo compounds and coupling components of relatively low coupling activity are preferred. Examples of low activity diazo compounds meeting this requirement are 2-diazo-1-hydroxy-naphthalene-5-sulfonic acid; certain p-diazodialkylanilines and p-diazophenylmorpholine. Low activity coupling components include 2-naphthol-3,6-disulfonic acid; 2,3-dihydroxynaphthalene; 2,3 - dihydroxynaphthalene-6-sulfonic acid.

For one component systems, both the diazo compound and the coupling compound should have high coupling activity. A typical diazo is p-diazo-2,5-dialkoxyanilides. Typical coupling compounds include resorcinol, phloroglucinol, 1-naphthol, 2-naphthol. The most suitable diazo compounds in either system have been found to have pronounced spectral absorption in the range of 3500–4000 A.

For the purpose of the disclosure and claims, the term "developing component" includes the azo coupling component in the one-component system and the alkaline material such as ammonia and amines in the two-component system. Also for purposes of this disclosure, the term "loading" means that the developing component is introduced into the inner adsorption region of the molecular sieve.

It is the main object of this invention to provide a process for developing diazotype papers without requiring passing the paper through an ammonia chamber or a liquid developer.

It is a further object to provide a developer wherein a developing component is stored until required for development reaction.

Another object is to provide a printing paper containing a crystalline zeolitic molecular sieve material containing a developing component.

Yet another object is to provide a paper coated with a crystalline zeolitic molecular sieve containing a developing component which will be contacted with the base material to develop the latent image thereon.

These and other objects will become apparent from the following disclosure and examples of the invention.

It has been discovered that when a crystalline zeolitic molecular sieve material is loaded with the azo coupling component or with a basic material and then controllably released in contact with a diazo printing paper, a good image will be developed on the base paper.

Crystalline zeolites ideally suited for this invention have pore sizes large enough to accept the developing component. For example, if ammonia is to be loaded on the sieve material, the zeolite should have a pore size of larger than about 3.8 A. If a phenol coupler is to be loaded on the sieve, the pore size should be larger than about 5.6 A.

The term "zeolite," in general, refers to a group of naturally occurring and synthetic hydrated metal aluminosilicates, many of which are crystalline in structure. There are, however, significant differences between the various synthetic and natural materials in chemical composition, physical properties and crystal structure, the latter as evidenced by X-ray powder diffraction patterns.

The structure of crystalline zeolitic molecular sieves may be described as an open three-dimensional framework of $SiO_4$ and $AlO_4$ tetrahedra. The tetrahedra are cross-linked by the sharing of oxygen atoms, so that the ratio of oxygen atoms to the total of the aluminum and silicon atoms is equal to two, or $O/(Al+Si)=2$. The negative electrovalence of tetrahedra containing aluminum is balanced by the inclusion within the crystal of cations, for example, alkali metal and alkaline earth metal ions such as sodium, potassium, calcium and magnesium ions. One cation may be exchanged for another by ion-exchange techniques.

The zeolites may be activated by driving off at least a portion of the water of hydration. The space remaining in the crystals after activation is available for adsorption of adsorbate molecules having a size, shape and energy which permits entry of the adsorbate molecules into the pores of the molecular sieves.

The zeolites occur as agglomerates of fine crystals or are synthesized as fine powders and are preferably tableted or pelletized for large scale adsorption uses. Pelletizing methods are known which are very satisfactory because the sorptive character of the zeolite, both with regard to selectivity and capacity, remains essentially unchanged.

The term "apparent pore size," as used herein, may be defined as the maximum critical dimension of the molecular species which is adsorbed by the zeolitic molecular sieve in question under normal conditions. The apparent pore size will always be larger than the effective pore diameter, which may be defined as the free diameter of the appropriate silicate ring in the zeolite structure.

Among the naturally occurring crystalline zeolitic molecular sieves are chabazite, erionite, faujasite, analcite, clinoptilolite and mordenite. The natural materials are adequately described in the chemical art. Synthetic zeolitic molecular sieves include zeolites A, D, R, T, X, Y and L. Zeolites such as types X, Y, L and faujasite are particularly useful because of their relatively large pore sizes.

Zeolite A is a crystalline zeolitic molecular sieve which may be represented by the formula:

$$1.0 \pm 0.2 \ M_{2/n}O:Al_2O_3:1.85 \pm 0.5 \ SiO_2:yH_2O$$

wherein M represents a metal, $n$ is the valence of M, and $y$ may have any value up to about 6. The as-synthesized zeolite A contains primarily sodium ions and is designated sodium zeolite A. Zeolite A is described in more detail in U.S. Patent No. 2,882,243 issued April 14, 1959.

Zeolite T is a synthetic crystalline zeolitic molecular sieve whose composition may be expressed in terms of oxide mole ratios as follows:

$$1.1 \pm 0.4[x\ Na_2O,\ (1-x)K_2O] : Al_2O_3 : 6.9 \pm 0.5\ SiO_2 : yH_2O$$

wherein $x$ is any value from about 0.1 to about 0.8 and $y$ is any value from about zero to about 8. Further characterization of zeolite T by means of X-ray diffraction techniques is described in U.S. Patent No. 2,950,952, issued August 30, 1960.

Zeolite X is a synthetic crystalline Zeolitic molecular sieve which may be represented by the formula:

$$0.9 \pm 0.2\ M_{2/n}O : Al_2O_3 : 2.5 \pm 0.5\ SiO_2 : yH_2O$$

wherein M represents a metal, particularly alkali and alkaline earth metals, $n$ is the valence of M, and $y$ may have any value up to about 8 depending on the identity of M and the degree of hydration of the crystalline zeolite. Sodium zeolite X has an apparent pore size of about 10 Angstrom units. Zeolite X, its X-ray diffraction pattern, its properties, and methods for its preparation are described in detail in U.S. Patent No. 2,882,244 issued April 14, 1959.

Zeolite Y is described and claimed in U.S. Patent application Serial No. 109,487, filed May 12, 1961, in the name of D. W. Breck, now Patent No. 3,130,007.

Zeolite L is described and claimed in U.S. Patent application Serial No. 122,398 filed July 7, 1961, in the names of D. W. Breck and N. A. Acara, now abandoned.

Zeolite D is described and claimed in U.S. Patent application Serial No. 680,381, filed August 26, 1957, in the name of R. M. Milton, now Patent No. 3,030,181.

Several methods may be employed for introducing the developing component to the inner adsorption region of the molecular sieve. For example, these materials may be introduced by vapor phase adsorption in which the material having appreciable vapor pressure is enclosed in a container with activated molecular sieve and transferred thereto by vapor phase. The adsorption rate may be increased by heating the container.

If the material does not possess appreciable vapor pressure, it may be adsorbed by the molecular sieve from a liquid solution wherein the solvent is not adsorbed. If the material is a solid, it may be adsorbed by intimate mixing or blending with the molecular sieve. Again heating either during or after blending accelerates the adsorption.

According to one aspect of the invention, there is provided a diazo type printing paper which is coated with a stabilized diazo compound of the type described above and which is also coated with a crystalline zeolitic molecular sieve loaded with an azo-coupling component. The azo compound loaded molecular sieve is coated on the paper by techniques well known in the art and which include for example, spraying.

Another form of the paper of the invention is a base paper coated with a diazo and azo compound coated with a molecular sieve material loaded with material alkaline in nature.

According to one form of practicing the method of the invention an alkaline material developing component is loaded in at least partly dehydrated crystalline zeolitic molecular sieve and then is coated on the diazo type paper which has been previously coated with the diazo compound and the azo coupling component. This provides a means for isolating the alkaline material in the coating during storage of the paper and during exposure to the light source in contact with the original to be reproduced. When the paper is passed through a heated chamber, the alkaline material is released from the sieve to activate the coupling reaction between the diazo and azo coupling component. This procedure eliminates the need for the heretofore conventional vapor or liquid developing step in the prior art.

Release of the developing component from the sieve may be obtained in several ways, for example by displacement or heat or by coadsorbing in the inner adsorption region of the at least partly dehydrated molecular sieve the developing component and a polar release agent. The expression "polar release agent" as used herein is defined as any chemical composition which possesses a positive dipole moment and is significantly adsorbable by crystalline zeolitic molecular sieves. Materials having a critical temperature below 25° C. are not significantly adsorbable at ambient conditions. Also, materials not having a significant vapor pressure, i.e., a few millimeters of mercury, at a temperature of about 600° C. would not be suitable as either the active chemical or the polar release agent. If a release agent is coadsorbed on the molecular sieve, the temperature at which the developing component is released is lower than when no release agent is present. Furthermore, the higher the release agent content in the molecular sieve, the lower the temperature at which the developing component is released or the more rapid it is released at a given temperature.

The combination of a molecular sieve with another material which will evolve water at an elevated temperature such as a hydrated salt or a water-loaded adsorbent could also provide a means for releasing the chemical from the molecular sieve under conditions which would not ordinarily result in sufficient release of the chemical. The release of the active chemical from molecular sieves can therefore be affected by increasing the temperature, by displacement with another adsorbable compound or by a combination of temperature increase and displacement in which the displacing medium is not available until an elevated temperature is reached.

The alkaline nature of molecular sieves in water media may also be utilized to provide the alkaline material for increasing the pH of the paper. If the paper is coated with water-loaded molecular sieve, water is released at an elevated temperature to raise the pH of the paper and thus assist in developing the image. Occlusion of a base such as sodium hydroxide with the water-loaded molecular sieve provides a convenient source of alkaline substance and gives slightly better image development.

The following examples are presented as illustrations of the present invention.

A commercial two-component diazo paper was coated on the reverse side with a Type X crystalline zeolitic molecular sieve loaded with 15 weight percent of benzyl dimethylamine by contacting the activated zeolite powder with the liquid amine. The sieve powder was applied by sprinkling such powder through a 100-mesh screen and spreading a thin layer over the surface of the paper. A plastic spray ("Plasti-lac," a transparent aerosol spray for library use) was then sprayed on the powder to adhere it to the paper. When the plastic dried, the excess powder was shaken off and the paper was contacted with the Master document and exposed to ultra-violet light for one minute. The exposed diazo paper was then placed in a steam-heated press at 330° F. one minute to release the benzyl dimethylamine. A good image developed during the heating step. In like manner, good images were also developed with the following loaded molecular sieves: 12 wt. percent ammonia on Type A molecular sieve, 15 wt. percent diethanolamine on Type X molecular sieve.

It is to be understood that the above description is merely to illustrate the principles of the present invention and that the same principles can be applied to other photosensitive copy processes without departing from the spirit and scope of this invention.

For example, diazoamino compounds are stable in alkaline media and are reconverted to the active diazo in acid media. Acetic acid vapor, for example, is used to develop active dyes. By employing the present invention, acid-loaded molecular sieves may be used in a manner similar to that described above to develop images by providing a source of acid. Compounds such as acetic acid, chloroacetic acid, trifluoroacetic acid, hydrogen chloride, methane sulfonic and others may be loaded on molecular sieve to provide an acid media when the adsorbed acid is released from the molecular sieve.

What is claimed is:

1. In a diazo printing process wherein a base material is coated with a light sensitive stabilized diazo compound and an azo coupling component and is then exposed to light under a pattern to decompose such diazo composed in the area of transparency of said pattern and then treating such exposed coated base material with a material alkaline in nature, the improvement which comprises adsorbing the material alkaline in nature within the inner adsorption region of at least partly dehydrated crystalline zeolitic molecular sieve and retaining such material therein and thereafter controllably releasing said material in contact with said base material to develop an image thereon.

2. A process according to claim 1 wherein said material alkaline in nature is ammonia.

3. A process according to claim 1 wherein said material alkaline in nature is benzyl dimethylamine.

4. A process according to claim 1 wherein said material alkaline in nature is diethanolamine.

References Cited by the Examiner

UNITED STATES PATENTS

| | | | |
|---|---|---|---|
| 3,018,264 | 1/1962 | Colclough | 260—2 |
| 3,036,980 | 5/1962 | Dunham et al. | 260—2 |
| 3,076,707 | 2/1963 | Lawton et al. | 96—49 X |

OTHER REFERENCES

Barrer et al.: Transactions of The Faraday Society, vol. 58, pp. 145–155, January 1962.

Chemical & Engineering News, vol. 39, No. 44, p. 89, Oct. 30, 1961.

NORMAN G. TORCHIN, *Primary Examiner.*

R. L. STONE, C. BOWERS, *Assistant Examiners.*